United States Patent [19]
Ikeda

[11] 3,807,661
[45] Apr. 30, 1974

[54] BALLOON ASSISTED AIRCRAFT

[76] Inventor: Minoru Ikeda, 526 Oishi Machi, Kurume, Japan

[22] Filed: Aug. 10, 1972

[21] Appl. No.: 279,367

[30] Foreign Application Priority Data
Oct. 28, 1971  Japan.............................. 46-086054

[52] U.S. Cl....................................... 244/5, 244/2
[51] Int. Cl.............................................. B64c 1/34
[58] Field of Search........... 244/2, 5, 26, 35, 46, 48, 244/144

[56] References Cited
UNITED STATES PATENTS
2,517,850  8/1950  Dillavou.................................. 244/5
1,424,491  8/1922  Langevin................................. 244/5
1,019,579  3/1912  Zells....................................... 244/5

Primary Examiner—Duane A. Reger
Assistant Examiner—Jesus D. Sotelo
Attorney, Agent, or Firm—Littlepage, Quaintance, Murphy & Dobyns

[57] ABSTRACT

An aircraft having an ovate balloon filled with a buoyant gas is positioned above the fuselage of a conventional airplane, supported by two side legs fixed to the main plane of the airplane and by an extendable rear leg, fixed to the tail portion of the fuselage, which changes the angle of attack of the main plane by regulating the balloon attitude.

6 Claims, 5 Drawing Figures

BALLOON ASSISTED AIRCRAFT

BACKGROUND OF THE INVENTION

1. Field of the Invention

The present invention relates to an aircraft that has the characteristics of both an airplane and an air ship. More particularly an airplane is equipped with a balloon having the means for controlling the angle of attack of the main plane or wings of the aircraft by the regulation of the relative attitude of the balloon.

An air ship using the static lifting power of a lighter-than-air gas and a conventional airplane using the dynamic lift generated by the motion of the applied air to the lifting surfaces of the fixed main plane or wing have, severally, merits and demerits. The air ship has the merit of static floating in the air while the airplane has the merit of speed, however, the former has the demerit of lacking in maneuverability and the latter has the demerit of lacking stability and easy of control.

Stability in an aircraft is that ability which the aircraft possesses of itself of returning to its original flight state when once displaced from that state. In general in the case of an unstable condition, the nature of the aircraft to sustain a balance can be considered as stability.

Maneuverability in an aircraft is that ability which the aircraft possesses to change the state of flight from one flight state to another easily. This maneuverability depends on such various elements as the aerodynamic characteristics of the airfract and position of the center of gravity. The present invention relates to an aircraft using the merits of the air ship and the airplane to compensate the demerits of each to achieve a stable yet maneuverable aircraft.

2. Description of the Prior Art

Aircraft in the prior art incorporating a balloon like structure for providing a static lift comprised two classes: the lighter-than-air crafts commonly referred to as air ships or dirigibles and the heavier-than-air crafts wherein would be found a craft according to this invention.

Common advantages found in the prior art include increased stability, increased lifting capacity, increased safety, shorter take-off and landing distances, reduced wing loading, increased efficiency of operation, and lower speed recommended for novice pilots. None of the aircraft of the prior art permitted a change in the attitude of the baloon relative to the airplane while in flight, take-off or landing. The balloon was simply an added lifting device and no control function is found in the prior art. Representative prior art is found in u.s. pat. Nos. 1,019,579; 1,383,509; 1,633,006 and 1,901,173.

SUMMARY

The aircraft according to the present invention provides a safe stable controllable flight because the balloon compensates for any unstable conditions associated with the airplane yet typically has substantially as much speed as the conventional small airplane. As the balloon is light in weight, the position of the center of gravity of the aircraft is in the lower portion of the whole structure thus a highly stable flight is expected.

Features and advantages of the present invention include the consumption of less fuel and less take-off and landing space than that normally used by a comparable conventional airplane. An especial advantage of the aircraft is suitability for elementary control exercises by a student pilot. Another advantage is increased lifting capacity with reduced wing load.

The unique feature of the present invention is an aircraft which can control the angle of attack of the main plane during take-off, level flight, and landing by regulating the relative attitude of an attached balloon. The advantage thus provided is the increased controllability of the aircraft.

DESCRIPTION OF THE PREFERRED EMBODIMENT

Figure 1:
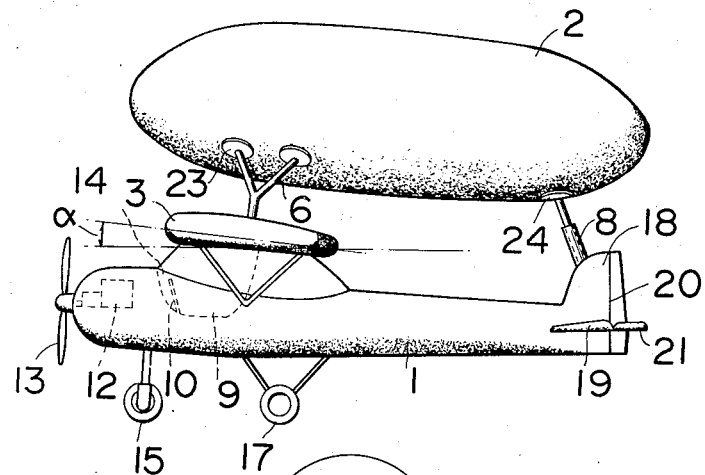
FIG. 1 is an elevated side view of an aircraft according to the present invention.
Figure 2:
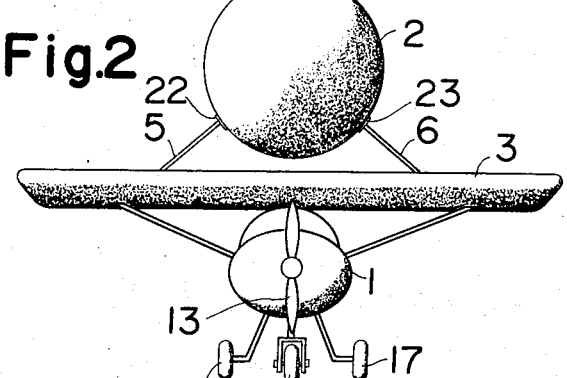
FIG. 2 is an elevated front view of the aircraft in FIG. 1.

FIGS. 1 and 2 show an airplane comprising a fuselage 1 and an operating compartment 9 within the fuselage the front of which is covered with a transparent wind shield 14. At the front of the airplane is a propeller 13 for propulsion driven by an engine 12 secured to the fuselage On the front and middle portion of the airplane under the fuselage are mounted in a conventional manner, a front wheel 15 and a left and right main wheel 16 and 17 respectively. A main plane or wing 3 is mounted on the fuselage generally orthogonal to the fuselage for providing dynamic lift. The tail section at the rear of the airplane for providing in-flight directional control conventionally comprises a vertical fin 18, a pair of horizontal stabilizers 19, a vertical rudder 20, and elevators 21. The airplane is equipped with all the conventional equipment of an ordinary light airplane and any conventional small airplane may be used according to the present invention.

The aircraft further comprises a generally ovate ballon 2 the skin of whice is made of an air-tight, strong, and light material such as nylon or polyethylene. The balloon is filled with a gas of low density such as helium. The balloon is supported in position by attachment means between the airplane and the balloon for maintaining the balloon at an established adjustable attitude. For attachment means further comprises a rigid means, for example a left and right pair of front legs 5 and 6 respectively, for pivotally attaching said baloon to the airplane, and by an extendable means, such as rear leg 8, for adjustably maintaining the attitude of the balloon. The rigid means can be rotatably fixed to the main plane or wing of the airplane while the extendable means is slidably and pivotally fixed to the fin of the tail section. The rigid means can also be rigidly fixed to the main plane of the airplane and rotatably fixed to the balloon.

Figure 3:
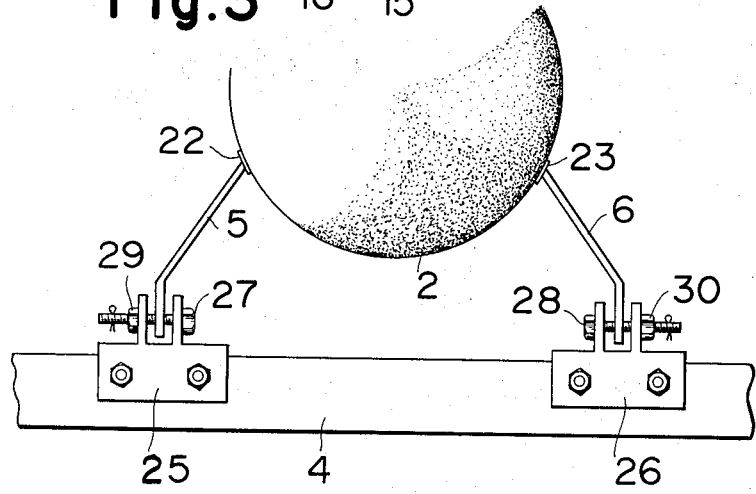
FIG. 3 is a front view of a balloon connected to an airplane by a pair of legs pivotally mounted to the main plane of the aircraft according to the present invention.

The upper ends of the left leg, right leg, and rear leg are fixed to a left seat zone 22, a right seat zone 23, and a rear seat zone 24 respectively equipped on the outer surface of the balloon. The upper portions of the fornt legs can be forked to strengthen the legs. FIG. 3 shows the lower end of the left leg and the right leg pivotally mounted on a left hinge 25 and a right hinge 26 respectively set on a spar 4 of the main plane. The left hinge and right hinge are secured to the main plane by a left bolt 27, a right bolt 28, a mating left nut 29, and a mating right nut 30 respectively.

Figure 4:
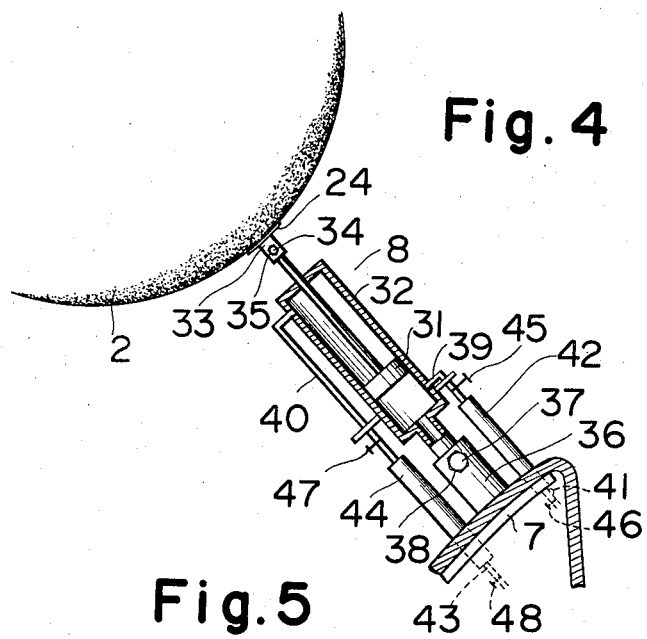
FIG. 4 is a side view of a balloon and tail section of an airplane interconnected by extendable and movable means for adjusting and maintaining the attitude of the balloon relative to the airplane.

The aircraft further comprises an adjustment means for adjusting the established balloon attitude. The adjustment means is shown in FIG. 4 as a piston 31 fixed to the rear leg 8 and slidably inserted in a pressure cylinder 32 for changing the length of the extendable means. The upper end of the rear leg is engaged with an upper hinge 33 and an upper bolt 34 acting as a pin secured by an upper nut 35. The lower end of the pressure cylinder 32 is engaged with a lower hinge 36 fixed to a rear frame 7 through the vertical fin 18 by a lower bolt 37 acting as a pin secured by a lower nut 38.

A first pressure or return feeding pipe 39 is rigidly in communication with the one end of the pressure cylinder 32 and a second pressure or return feeding pipe 40 is rigidly in communication with the other end of the pressure cylinder, the piston 31 being between the communicated portions of the cylinder. The pipe 39 is connected to a first feeding pipe 41 which is extended out of the verticle fin via a first flexible pipe 42. In like manner the pipe 40 is connected to a second feeding pipe 43 via a second flexible pipe 44. On the first pipe 39 and on the first feeding pipe 41 are respectively mounted stop valves 45 and 46. In like manner on the second pipe 40 and on the second feeding pipe 43 are respectively mounted stop valves 47 and 48 thereby permitting easy dismounting of the rear leg and pressure cylinder.

The adjustment means further comprises a control means 10, positioned in the operating compartment of the aircraft, for operating said movable means and an input responsive, pressure maintaining means shown as a hydraulic pressure means 11 for operably interconnecting the movable means and the control means. The angle of incidence or angle of attack $\alpha$ of the main plane is regulated by the length of the extendable means such as the rear leg 8 with the aid of an input responsive, pressure maintaining means controlled by a control means.

Figure 5:
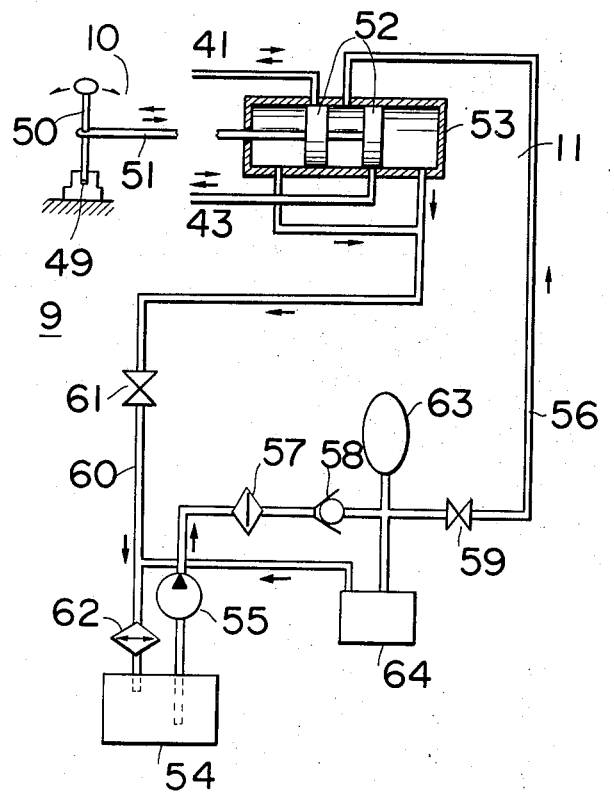
FIG. 5 is a schematic view of an input responsive, pressure maintaining hydraulic system for regulating the attitude of the balloon relative to the airplane.

The control means 10 shown in FIG. 5 comprises a hinge 49 fixed rigidly in the operating compartment 9 of the airplane. An operating lever 50 is pinned to the upper end of the hinge and to a connecting bar 51. An input responsive, pressure maintaining means 11 comprises a valve cylinder 53 including a double valve 52 connected to the connecting bar, a pressure pump 55 the suction side of which is opened into a tank 54 and the exhaust side of which is connected to a feeding pipe 56 having a filter 57, a check valve 58, and a stop valve 59 successively in order. The pressure maintaining means further comprises a feed back means for allowing return of the pressurizing fluid comprising a feed back pipe 60 one end of which is connected to a feed back side of the valve cylinder 53 and the other end of which is opened into the tank 54 via a stop valve 61 and a cooler 62 successively mounted on the feed back pipe 60 between the stop valve 61 and the cooler 62 via a pressure regulating valve 64.

As an example, when the operating lever 50 in the control means 10 is moved to the left as shown in FIG. 5, the first feeding pipe 41 is connected with the first chamber of the valve cylinder 53 filled with the pressurized fluid and at the same time the second feeding pipe 43 is connected with the second chamber of the valve cylinder 53 filled with the non-pressurized fluid. The pressurized fluid is supplied to the first chamber of the pressure cylinder via the first pipe 39 and at the same time the non-pressurized fluid in the second chamber of the pressure cylinder comes back to the tank 54 via the second pipe 40, the second feeding pipe 43, the valve cylinder 53, and the feed back pipe 60. Accordingly as the piston goes forward, the length of the rear leg is elongated thus adjusting the established balloon attitude. The rear portion of the airplane consequently becomes lowered and the angle of attack $\alpha$ of the main plane becomes larger.

On the other hand, when the operating lever 50 is pushed to the right, the second feeding pipe 43 is connected with the second chamber filled with the pressurized fluid of the valve cylinder 53. The pressurized fluid is supplied to the second chamber of the cylinder 32 via the second feeding pipe 40. The non-pressurized fluid in the first chamber of the pressure cylinder goes back to the tank 54 via the first pipe 39, the first feeding pipe 41, the valve cylinder 53, and the feed back pipe 60. Accordingly, as the piston 31 goes backwards and the length of the rear leg is shortened, the rear portion of the airplane raises and the angle of attack $\alpha$ of the main plane becomes smaller. Accurate incremental control of the control lever 50 causes accurate incremental regulation of the rear leg thereby effecting an accurate trim regulation of the attack angle. In all other respects the control of the aircraft according to this invention is similar to that of the ordinary light airplane.

In summary, an aircraft according to the present invention comprises a conventional heavier-than-air airplane controlled in the conventional manner from an operating compartment located within the airplane. The aircraft further comprises an air-tight balloon containing a lighter-than-air gas. The balloon is attached to the airplane by an attachment means for maintaining the balloon at an established adjustable attitude with respect to the airplane. Operated from said operating compartment is an adjustment means for adjusting said established balloon attitude.

The static lifting power of the lighter-than-air gas within the balloon is added to the dynamic lift generated by the lighting surfaces of the fixed plane of the airplane thus enabling an aircraft based on the present invention to take-off easier and at lower speed. In flight the static lift contributes to a higher degree of safety and control than is found in a conventional airplane. Further, as the angle of incidence of the main plane can be controlled by the regulation of the length of a rear leg by adjusting the attitude of the balloon above the fuselage, not only is the climbing rate accelerated but also the distance for taking off and landing is shortened.

The aircraft according to the present invention can be used for the training of students in elementary flight. At the beginning of flight exercises, a large type of the balloon can be selected and later a smaller type selected according to the degree of acquired mastery. Lastly the balloon can be taken off and as a conventional airplane, the training is completed. A prompt mastery of the elementary flight principles can thus be acquired by the student with an added margin of safety present at the early learning stages.

What is claimed is:

1. An aircraft comprising
   a fuselage,
   a tail section mounted at the rear of the fuselage,
   an operating compartment located within the fuselage from which the aircraft is controlled,
   a main plane mounted on the fuselage for providing dynamic lift,
   a balloon containing a lighter-than-air gas,
   three-point attachment means attaching the balloon to two laterally separated points on the main plane and to a third point in the tail section for maintaining the balloon at an established adjustable attitude with respect to the main plane, and
   adjustment means, attached to the tail section at said third point and operated from said operating compartment for adjusting the established balloon attitude.

2. An aircraft according to claim 1 wherein the main plane comprises a right and a left wing and wherein the attachment means comprises a right and a left rigid leg respectively hinged to the right and the left wing.

3. An aircraft according to claim 1 wherein the balloon is an ovate balloon positioned in a longitudinal direction above the fuselage.

4. An aircraft according to claim 1 wherein the attachment means is pivotally attached to the balloon.

5. An aircraft according to claim 1 wherein the adjustment means further comprises:
   movable means, slidably mounted to said attachment means, for changing the length of the attachment means,
   control means operable from said operating compartment for operating the movable means, and
   input responsive, pressure maintaining means, responsive to said control means and maintaining a pressure on said movable means, for operable interconnecting the movable means and the control means.

6. An aircraft comprising a fuselage, an operating compartment within the fuselage for enclosing the aircraft operator, a main plane mounted orthogonally on the fuselage for providing dynamic lift, a tail section mounted at the rear of the fuselage for providing directional control of the aircraft while in flight, an air-tight, ovate balloon containing a lighter-than-air gas positioned in a longitudinal direction above the fuselage for providing static lift insufficient to lift the whole aircraft, rigid means pivotally mounted to said main plane at two laterally separated points on said main plane and fixed to said balloon for pivotally attaching said balloon to said main plane, extendable means movably mounted to said tail section and fixed to said balloon for adjustably maintaining the attitude of said balloon, and thereby the angle of attack of said main plane, movable means slidably and pivotally interconnecting said extendable means and said tail section for changing the length of the extendable means thereby adjusting said balloon attitude, control means operable from and located within said operating compartment for operating the movable means, and input responsive, pressure maintaining means, responsive to said control means and maintaining a pressure on said movable means, for operably interconnecting the movable means and the control means.

* * * * *